United States Patent [19]

Murakami et al.

[11] Patent Number: 4,774,614
[45] Date of Patent: Sep. 27, 1988

[54] MAGNETIC HEAD ADJUSTING DEVICE

[75] Inventors: Keisuke Murakami; Masayosi Kawahira; Chihiro Aoki, all of Shizuoka, Japan

[73] Assignee: Tokyo Electric Co., Ltd., Tokyo, Japan

[21] Appl. No.: 836,149

[22] Filed: Mar. 4, 1986

[30] Foreign Application Priority Data

Mar. 15, 1985 [JP] Japan .................. 60-53088

[51] Int. Cl.$^4$ .............................................. G11B 5/56
[52] U.S. Cl. .................................. 360/109; 360/106
[58] Field of Search .............. 360/75, 109, 97, 99, 360/104, 76

[56] References Cited

U.S. PATENT DOCUMENTS

| | | | |
|---|---|---|---|
| 4,097,908 | 6/1978 | Chou et al. | 360/76 |
| 4,133,015 | 1/1979 | Butsch | 360/109 |
| 4,587,587 | 5/1986 | Miller | 360/109 |

FOREIGN PATENT DOCUMENTS

| | | | |
|---|---|---|---|
| 0083215 | 5/1985 | Japan | 360/109 |
| 0163223 | 8/1985 | Japan | 360/109 |

OTHER PUBLICATIONS

IBM Technical Disclosure Bulletin, A. B. Habich, vol. 10, No. 12, May 1968, Adjustable Magnetic Head.

Primary Examiner—Robert S. Tupper
Assistant Examiner—Andrew L. Sniezek
Attorney, Agent, or Firm—Oblon, Fisher, Spivak, McClelland & Maier

[57] ABSTRACT

A head retainer for retaining a magnetic head is mounted to a carrier adapted to reciprocate toward a center of a driving shaft for driving a magnetic disc and includes an azimuth adjusting mechanism for varying a direction of the head retainer with respect to a rotative axis parallel to the driving shaft and a head orientation adjusting mechanism for letting the head retainer approach to or move away from the magnetic disc and incline relative to the same plane as the magnetic disc. With this arrangement, when a position and orientation of the magnetic head are varied during or after assembling of the device, such variation may be accurately corrected.

17 Claims, 3 Drawing Sheets

MAGNETIC HEAD ADJUSTING DEVICE

BACKGROUND OF THE INVENTION

The present invention relates to a magnetic recording/reproducing device for magnetically recording and reproducing information by scanning a magnetic head in a radial direction of a circular magnetic disc, and more particularly to a magnetic head adjusting device for adjusting a position and attitude, etc. of the magnetic head relative to the magnetic disc.

Conventionally, there exists a magnetic recording/reproducing device for magnetically recording and reproducing information by rotating a driving shaft of the circular magnetic disc and moving the magnetic head retained by a carrier in the radial direction of the magnetic disc.

In order to perform accurate recording and reproducing, accuracy of scanning of the magnetic head to the magnetic disc must be high. Concretely, it is necessary to precisely determine a relative positional relation between the driving shaft and the magnetic head. There has been conventionally provided means for properly positioning the magnetic head by a jig upon retaining the magnetic head to the carrier and thereafter fixing the magnetic head to the carrier by adhesive.

The aforementioned prior art has the following problem. The adhesive interposed between the magnetic head and the carrier is changed in size upon curing. Especially, the larger the amount of the adhesive, the more remarkable is the change in size. As a result, a position and orientation of the magnetic head bonded to the carrier are changed in association with curing of the adhesive. In some cases, the amount of change in position exceeds a permissible value. However, even when the amount of change in position of the magnetic head finally exceeds the permissible value, it is impossible to positionally readjust the magnetic head bonded to the carrier. Accordingly, such a poorly adjusted product must be abandoned.

SUMMARY OF THE INVENTION

It is an object of the present invention to provide a magnetic head adjusting device which may accurately adjust and readjust a position and orientation of a magnetic head relative to a carrier at a desired time.

According to the present invention, a head retainer for retaining the magnetic head is mounted to the carrier adapted to reciprocate toward the center of a driving shaft for driving a magnetic disc. Further, an azimuth adjusting mechanism is provided for varying the direction of the head retainer with respect to a rotative axis parellel to the driving shaft. Furthermore, a head orientation adjusting mechanism is provided for letting the head retainer approach to and move away from the magnetic disc and incline relative to the same plane as the magnetic disc. Owing to the provision of the head orientation adjusting mechanism, a proper spacing between the magnetic head and the magnetic disc may be defined, and simultaneously parallelism of the magnetic head relative to the magnetic disc may be adjusted. Further, owing to the provision of the azimuth adjusting mechanism, the head retainer may be displaced in a rotative direction about an axis parallel to the driving shaft to direct a head gap of the magnetic head toward the center of the driving shaft. Accordingly, the position and orientation of the magnetic head may be freely adjusted as required in any assembling steps.

The invention will be more fully understood from the following detailed description and appended claims when taken with the drawings.

DETAILED DESCRIPTION OF THE PREFERRED EMBODIMENTS

Figure 1:
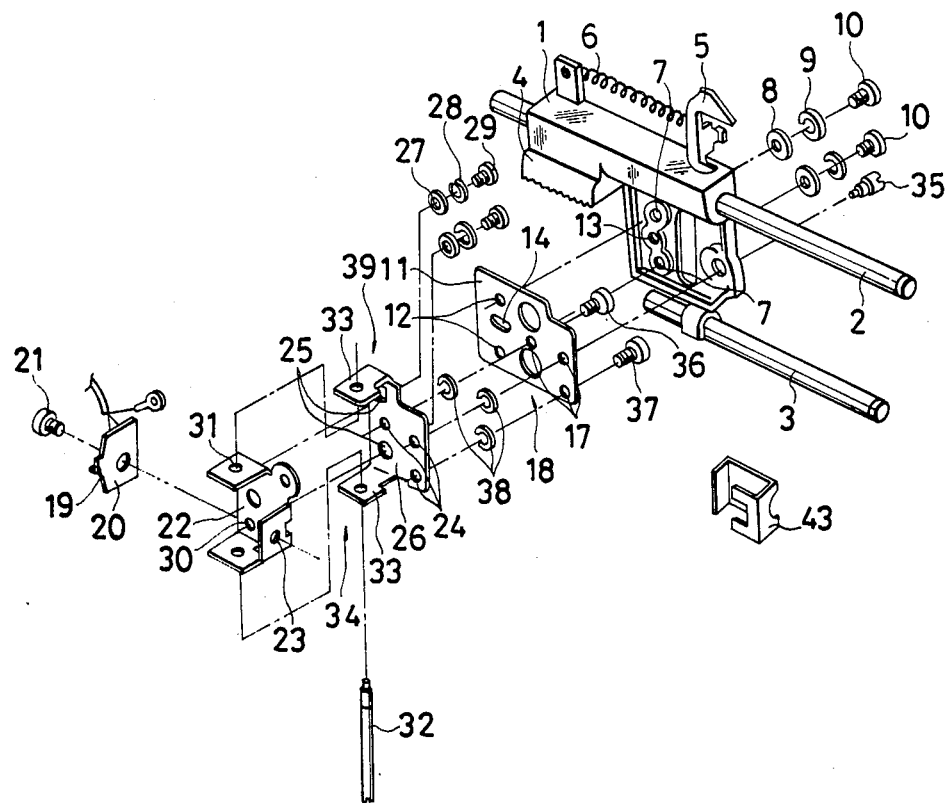
FIG. 1 is an exploded perspective view showing a preferred embodiment of the present invention.

There will be now described a preferred embodiment of the present invention with reference to FIGS. 1 to 5. Two carrier shafts 2 and 3 are arranged in perpendicular relation to a driving shaft 41 for driving a magnetic disc (not shown), and a carrier 1 is slidably retained to the carrier shafts 2 and 3. The carrier 1 is provided with a rack 4 meshing with a driving gear 40, and is biased to one direction by a spring 6 retained to a frame 5 at one end thereof which frame is partially shown. In a general arrangement, there are connected to the carrier 1 a rotating member 11, a head orientation adjustment member 26, a head retainer 22 and a head base 20 having a magnetic head 19 in this order. The connections of each member constitute an azimuth adjusting mechanism 18, an off-track adjusting mechanism 34 and a head orientation adjusting mechanism 39. A connecting condition of each member and each of the adjusting mechanisms will be explained in the following.

The head base 20 is fixed to a bent portion 23 formed at the head retainer 22 by a screw 21. The head retainer 22 is formed with screw holes 31 with which a rod-like off-track adjustment screw 32 is threadedly engaged. The off-track adjustment screw 32 is rotatably supported to projections 33 formed at the head orientation adjustment member 26 with axial movement of the screw inhibited. The off-track adjustment screw 32 is arranged in such a direction that its axial direction is perpendicular to both axial directions of the carrier shafts 2 and 3 and the driving shaft 41. Both of the head retainer 22 and the head orientation adjustment member 26 are fixable by head retainer fastening screws 29. That is to say, the head retainer fastening screws 29 are inserted through washers 27 and spring washers 28 into elongated holes 25 formed at the head orientation adjustment member 26, and are threadedly engaged with screw holes 30 formed at the head retainer 22. Thusly, the aforementioned off-track adjusting mechanism is constituted.

The rotating member 11 is formed with three holes 17 at predetermined positions, and the head orientation adjustment member 26 is formed with screw holes 24 at such positions as to mate with these holes 17. First, second and third adjustment screws 35, 36 and 37 are inserted through the holes 17 from the back side of the carrier 1, and are threadedly engaged through elastic members 38 with the screw holes 24. The screw hole 24 engaged with the first adjustment screw 35 is aligned with the center of the magnetic head 19 in a direction parallel to rotational center 42. Thus the rotating member 11 and the attitude adjustment member are fixed by the screw 35 at a point colinear with the magnetic head 19 in a direction parallel with the driving shaft 42. The screw hole 24 engaged with the second adjustment screw 36 is positioned on a line connecting the center 42 of the driving shaft 41 with the first adjustment screw 35. Finally, the screw hole 24 engaged with the third adjustment screw 37 is positioned on a line perpendicular to a line connecting the first adjustment screw 35 with the second adjustment screw 36, which former line passing through the first adjustment screw 35. Head portions of the adjustment screws 35, 36 and 37 are positioned in a space part of the carrier 1, and has no engagement relation with the carrier 1. The elastic members 38 are formed by spirally winding a steel wire once. Thusly, the aforementioned head attitude adjusting mechanism 39 is constituted.

The rotating member 11 is rotatable about the first adjustment screw 37 relative to the carrier 1. Further, the carrier 1 and the rotating member 11 are fixable to each other by means of rotating member fastening screws 10. That is to say, the rotating member fastening screws 10 are inserted through washers 8 and spring washers 9 into two holes 7 formed at the carrier 1, and are threadedly engaged with screw holes 12 formed at the rotating member 11. The carrier 1 is formed with a circular hole 13. A base portion of an eccentric cam 15 is inserted into the hole 13 from the back side of the carrier 1 and is rotatably retained in the hole 13. The eccentric cam 15 is provided with a projection 16 formed eccentrically from the axis at the free end thereof. The projection 16 is engaged with an elongated engagement hole 14 formed at the rotating member 11. Thusly, the aforementioned azimuth adjusting mechanism 18 is constituted.

Figure 2:
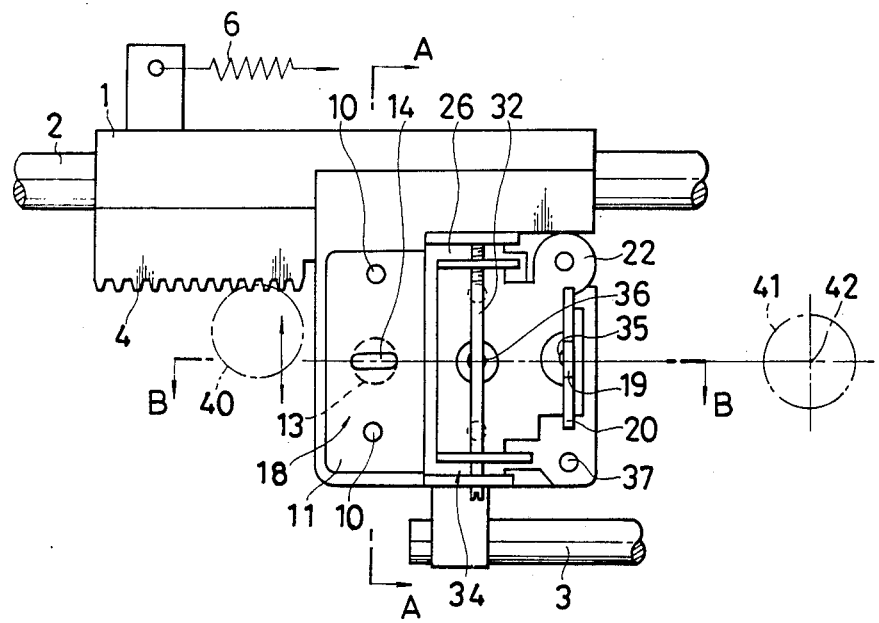
FIG. 2 is a front elevational view of the magnetic head adjusting device in FIG. 1.
Figure 3:
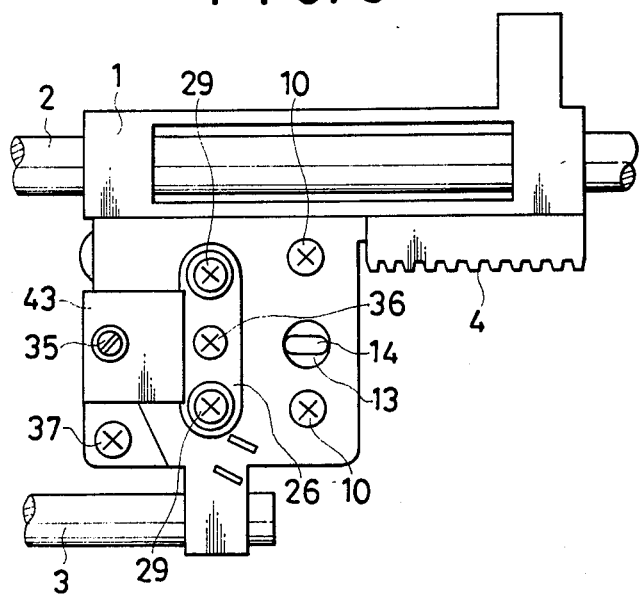
FIG. 3 is a rear elevational view of the magnetic head adjusting device in FIG. 1.
Figure 4:
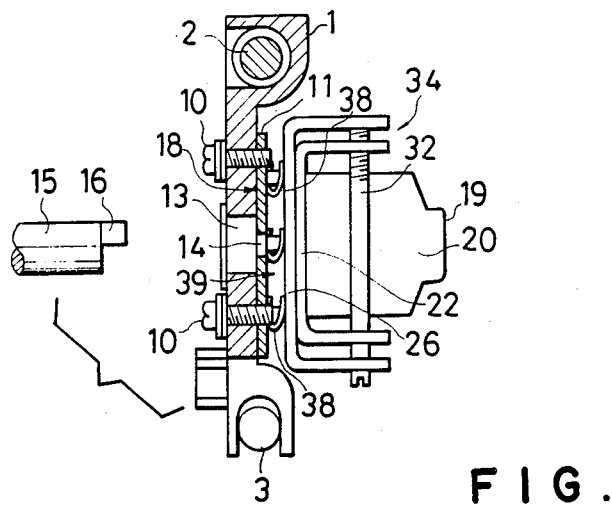
FIG. 4 is a vertical sectional view taken along the line A—A in FIG. 2.
Figure 5:
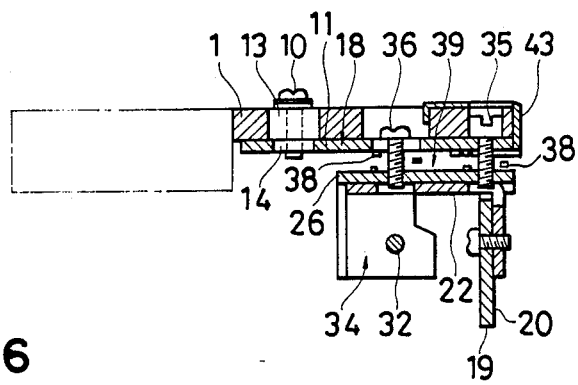
FIG. 5 is a horizontal sectional view taken along the line B—B in FIG. 2.

In operation, when the driving gear 40 meshing with the rack 4 is rotated by means of a motor (not shown) as shown in FIG. 2, the carrier 1 is moved along the carrier shafts 2 and 3. As a result, the magnetic head 19 is moved toward the center 42 of the driving shaft 41 for driving the magnetic disc thereby to carry out recording or reproducing of information.

An adjustment operation of the magnetic head 19 is carried out in the following manner. First, the adjustment screws 35, 36 and 37 are rotated to let the head orientation adjustment member 26 approach to or move away from one surface of the magnetic disc, thereby determining a facing position of the magnetic head 19 relative to the magnetic disc. At this time, fastening extent of the three adjustment screws 35, 36 and 37 is adjusted to adjust parallelism of the head orientation adjustment member 26 relative to the one surface of the magnetic disc and thereby obtain a parallel contact condition of the magnetic head 19 to the magnetic disc. In other words, when the second adjustment screw 36 is rotated, the head orientation adjustment member 26 is inclined with respect to the line connecting the first adjustment screw 35 with the third adjustment screw 37 as a fulcrum, while when the third adjustment screw 37 is rotated, the head orientation adjustment member 26 is inclined with respect to the line connecting the first adjustment screw 35 with the second adjustment screw 36 as a fulcrum. In this manner, as the three adjustment screws 35, 36 and 37 are used, parallelism of the head attitude adjustment member 26 to the magnetic disc may be easily obtained.

Then, the off-track adjustment screw 32 is rotated to displace the head retainer 22 relative to the head orientation adjustment member 26. As a result, the magnetic head 19 is displaced in such a direction as perpendicular to both the moving direction of the carrier 1 and the axial direction of the driving shaft 41, and is positioned on a line parallel to the moving direction of the carrier 1 and passing through the center 42 of the driving shaft 41. At this time, since the head retainer 22 is displaced in tight contact with the head orientation adjustment member 26 the parallelism of which has been adjusted, the contact condition of the magnetic head 19 to the magnetic disc is not varied. Such adjustment of off-track may be carried out with the head retainer fastening screws 29 remaining fastened because a range of the adjustment is in a micron unit.

Finally, the eccentric cam 15 engaged with the circular hole 13 of the carrier 1 is rotated to rotate the rotating member 11 by means of the projection 16 and direct the head gap of the magnetic head 19 toward the center 42 of the driving shaft 41. Thus, an azimuth angle of the magnetic head 19 is adjusted. As the range of such adjustment is also in a micron unit, the adjustment may be carried out with the rotating member fastening screws 10 remaining fastened. At this time, since the rotating member 11 is rotated about the center of the magnetic head 19, more particularly, about a line passing through the magnetic head 19 and the point colinear therewith in the direction parallel with the driving shaft, that is, the first adjustment screw 35, there is no possibility of the position of the magnetic head 19 being varied.

In this way, each of the aforementioned adjusting operations may be carried out at an arbitrary time during or after assembling. In addition, the magnetic head 19 may be displaced to various positions and directions by combining each of the adjusting operations to expectedly attain accurate adjustment. Accordingly, even if it is found that the position of the magnetic head 19 is incorrect after assembling of the device, the magnetic head 19 may be easily corrected to the accurate position, and as a result, defective assembling may be recovered.

Figure 6:
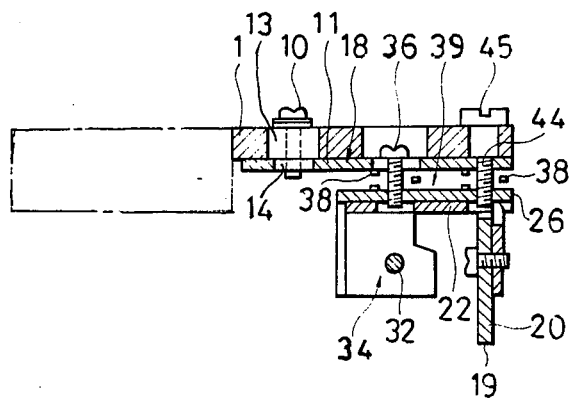
FIG. 6 is a horizontal sectional view showing a modified embodiment of the present invention.

While the end portion of the rotating member 11 is separated from the rotating member fastening screws 10, the end portion and a part of the carrier 1 are clamped by a leaf spring 43 to prevent floating of the rotating member 11 from the carrier 1. In a modified embodiment as shown in FIG. 6, a first adjustment screw 44 having a head portion 45 adapted to urge the back surface of the carrier 1 may be used in substitution for the first adjustment screw 35 to clamp both the carrier 1 and the rotating member 11 by means of the head portion 45 and the elastic member 38. Further, the elastic member 38 may include a coil spring and rubber, etc.

Having thus described the preferred embodiment of the invention, it should be understood that numerous structural modifications and adaptations may be made without departing from the spirit of the invention.

What is claimed is:

1. A magnetic head adjusting device comprising:
a driving shaft for driving a magnetic disc;
a carrier adapted to reciprocate toward a center of said driving shaft;
a head retainer mounted to said carrier;

a magnetic head retained by said head retainer;

an azimuth adjusting mechanism for varying a direction of said head retainer with respect to a rotative axis parallel to said driving shaft to adjust an azimuth angle of said magnetic head; and a head orientation adjusting mechanism for letting said head retainer approach to or move away from one surface of said magnetic disc and incline relative to a parallel plane opposed to the one surface of said magnetic disc, wherein said azimuth adjusting mechanism and said head orientation adjusting mechanism together include means for fixing said carrier and said head retainer at a point colinear with said magnetic head in a direction parallel to said driving shaft.

2. The magnetic head adjusting device as defined in claim 1, wherein said azimuth adjusting mechanism further comprises a rotating member connected relative to said head retainer and mounted to said carrier so as to be rotatable with respect to said carrier about a rotative axis parallel to said driving shaft and means for fixing said rotating member relative to said carrier at a fixed position.

3. The magnetic head adjusting device as defined in claim 2, wherein said azimuth adjusting mechanism further comprises a rotating member fastening screw mounting said rotating member to said carrier adjacent said point, a circular hole formed at said carrier, an eccentric cam rotatably engaged with said circular hole, and an engagement portion formed in said rotating member, said engagement portion being engaged with said eccentric cam for receiving a rotative torque such that said rotating member can rotate about a line passing through said point and said magnetic head.

4. The magnetic head adjusting device as defined in claim 2, further comprising a leaf spring for clamping both said rotating member and said carrier in such a position as to be separated from said head retainer.

5. The magnetic head adjusting device as defined in claim 2, wherein said head orientation adjusting mechanism comprises elastic means provided between said rotating member and said head retainer, a first adjustment screw extending through said point in said direction parallel to said driving shaft for connecting said rotating member with said head retainer in such a manner that said magnetic head may approach to or move away from the one surface of said magnetic disc, a second adjustment screw for connecting said rotating member with said head retainer in such a manner that said magnetic head may approach to or move away from the one surface of said magnetic disc and may incline to the same direction as an advancing direction of said carrier, and a third adjustment screw for connecting said rotating member with said head retainer in such a manner that said magnetic head may approach to or move away from the one surface of of said magnetic disc and may incline to the same direction as an axial direction of said driving shaft.

6. The magnetic head adjusting device as defined in claim 5, wherein said second adjustment screw is on a first line connecting said driving shaft with said first adjustment screw and said third adjustment screw on a second line passing through the vicinity of said first adjustment screw, said second line being substantially perpendicular to a third line connecting said first adjustment screw with said second adjustment screw.

7. The magnetic head adjusting device as defined in claim 3, wherein said head orientation adjusting mechanism comprises elastic means provided between said rotating member and said head retainer, a first adjustment screw comprising said rotating member fastening screw and extending through said point in said direction parallel to said driving shaft for connecting said rotating member with said head retainer in such a manner that said magnetic head may approach to or move away from the one surface of said magnetic disc, a second adjustment screw for connecting said rotating member with said head retainer in such a manner that said magnetic head may approach to or move away from the one surface of said magnetic disc and may incline to the same direction as an advancing direction of said carrier, and a third adjustment screw for connecting said rotating member with said head retainer in such a manner that said magnetic head may approach to or move away from the one surface of of said magnetic disc and may incline to the same direction as an axial direction of said driving shaft.

8. The magnetic head adjusting device as defined in claim 7, wherein said second adjustment screw is on a first line connecting said driving shaft with said first adjustment screw and said third adjustment screw on a second line passing through the vicinity of said first adjustment screw, said second line being substantially perpendicular to a third line connecting said first adjustment screw with said second adjustment screw.

9. The magnetic head adjusting device as defined in claim 1, wherein said head orientation adjusting mechanism comprises a rotating member provided between said carrier and said head retainer, elastic means provided between said rotating member and said head retainer, a first adjustment screw extending through said point in said direction parallel to said driving shaft for connecting said rotating member with said head retainer in such a manner that said magnetic head may approach to or move away from the one surface of said magnetic disc, a second adjustment screw for connecting said rotating member with said head retainer in such a manner that said magnetic head may approach to or move away from the one surface of said magnetic disc and may incline to the same direction as an advancing direction of said carrier, and a third adjustment screw for connecting said rotating member with said head retainer in such a manner that said magnetic head may approach to or move away from the one surface of of said magnetic disc and may incline to the same direction as an axial direction of said driving shaft.

10. The magnetic head adjusting device as defined in claim 9, wherein said second adjustment screw is on a first line connecting said driving shaft with said first adjustment screw and said third adjustment screw on a second line passing through the vicinity of said first adjustment screw, said second line being substantially perpendicular to a third line connecting said first adjustment screw with said second adjustment screw.

11. The magnetic head adjusting device as defined in claim 9, wherein said first adjustment screw has a head portion for urging said carrier to said rotating member.

12. The magnetic head adjusting device as defined in claim 11, wherein said head portion of said first adjustment screw is projected from said carrier.

13. The magnetic head adjusting device as defined in claim 9, wherein said elastic means is formed by a spring washer.

14. The magnetic head adjusting device as defined in claim 9, wherein said elastic means is formed by a coil spring.

15. The magnetic head adjusting device as defined in claim 9, wherein said elastic means is formed of rubber.

16. The magnetic head adjusting device of claim 1 including:
an off-track adjusting mechanism comprising a head orientation adjustment member retained by said rotating member, wherein said head retainer is retained by said head orientation adjustment member by means for displacing said head retainer in a direction perpendicular to both a moving direction of said carrier and an axial direction of said driving shaft.

17. The magnetic head adjusting device as defined in claim 16, wherein said off-track adjusting mechanism further comprises a head retainer fastening screw for fixing said head orientation adjustment member to said head retainer and an off-track adjustment screw supported on said head orientation adjustment member for displacing said head retainer in a direction perpendicular to the moving direction of said carrier.

* * * * *